J. B. SITTS.
TRAP.
APPLICATION FILED SEPT. 4, 1918.

1,296,437.

Patented Mar. 4, 1919.
2 SHEETS—SHEET 1.

Witnesses
K. A. Thomas

Inventor
Jacob B Sitts
By Victor J. Evans
Attorney

J. B. SITTS.
TRAP.
APPLICATION FILED SEPT. 4, 1918.
1,296,437.
Patented Mar. 4, 1919.
2 SHEETS—SHEET 2.
Fig. 3.
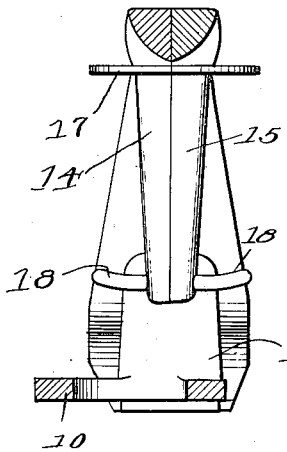
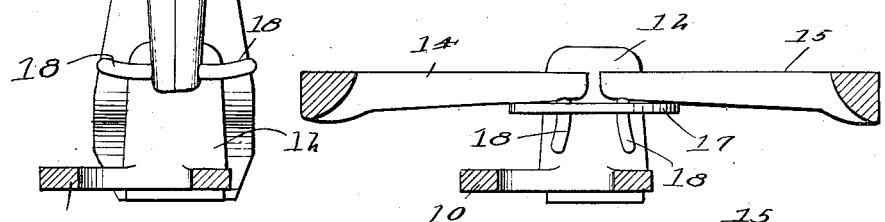
Fig. 6.
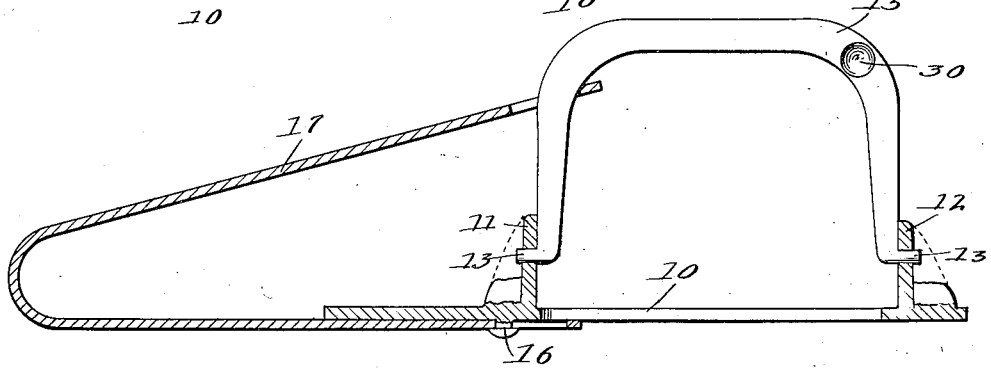
Fig. 5.
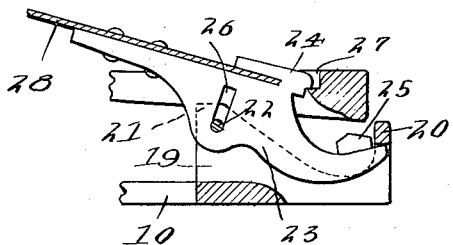
Fig. 4.
Witnesses
R. A. Thomas
Inventor
Jacob B. Sitts
By Victor J. Evans
Attorney

UNITED STATES PATENT OFFICE.

JACOB B. SITTS, OF WAMPSVILLE, NEW YORK.

TRAP.

1,296,437.  Specification of Letters Patent.  Patented Mar. 4, 1919.

Application filed September 4, 1918. Serial No. 252,557.

*To all whom it may concern:*

Be it known that I, JACOB B. SITTS, a citizen of the United States, residing at Wampsville, in the county of Madison and State of New York, have invented new and useful Improvements in Traps, of which the following is a specification.

This invention relates to an improved animal trap.

One of the objects of the invention is to produce a trap which will set automatically, that is, upon the compression of the spring the jaws will be moved to their open position and one of the said jaws engaged by a dog connected with the pan so that movement of the pan by the hand of the operator and the dangers incident thereto, are entirely overcome.

A further object of the invention is to produce a trap which, when set can not be sprung until weight is applied directly to the pan thereof.

A further object of the invention is to produce a trap which may be set by one hand of the operator.

A still further object of the invention is to produce a trap in which the animal will be prevented from escape by movement longitudinally of the jaws.

A further object of the invention is to produce a trap which will not break the skin of the animal, and thus cause the animal to gnaw away his paw and escape from the trap, as is frequent with the employment of toothed jaws.

Further objects and advantages will appear as the nature of the invention is better understood, reference being had to the accompanying drawings, in which:

Fig. 3 is a sectional view approximately on the line 3—3 of Fig. 1;

Fig. 4 is a sectional view approximately on the line 4—4 of Fig. 2;

Fig. 5 is a sectional view approximately on the line 5—5 of Fig. 1; and

Fig. 6 is a sectional view approximately on the line 6—6 of Fig. 2.

Figure 1:
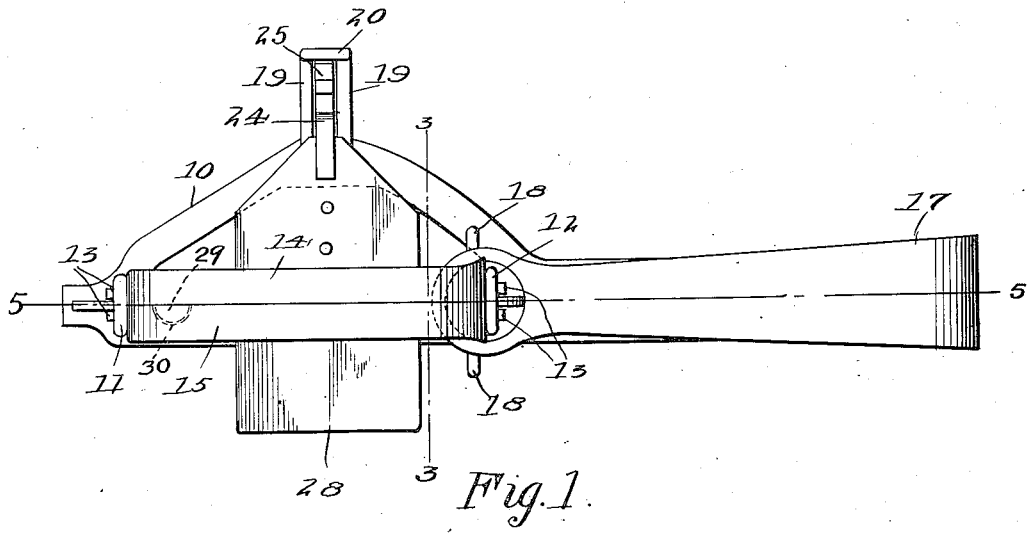
Figure 1 is a plan view of a trap constructed in accordance with the present invention.
Figure 2:
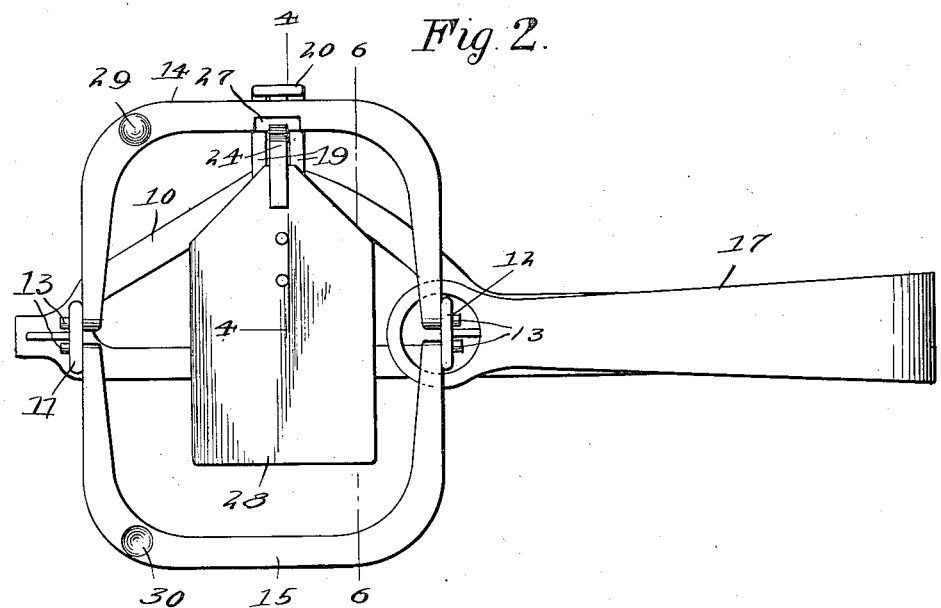
Fig. 2 is a similar view showing the trap set.

Referring to the drawings in detail, the base or bed of the trap is indicated by the numeral 10, being provided, adjacent its ends with the usual upstanding lugs 11 and 12 respectively, each of the said lugs having spaced openings receiving the lugs 13 that provide trunnions for the parallel arms of the substantially U-shaped jaws 14 and 15 respectively.

Pivotally secured to the base as indicated at 16 is the lower arm of the jaw operating spring 17, the upper arm being widened at the end thereof in the usual manner and provided with the usual opening receiving the inner arms of the jaws 14 and 15, and this end of the spring is designed, when the same is compressed, to contact with outwardly extending fingers 18 formed on the said arms of the respective jaws. By this means, when the spring is compressed the jaws are automatically swung to open position, the said fingers being arranged at a slight upward inclination, as clearly illustrated by the drawings so that the full opening of the jaws will be assured.

On the base, outward of the lugs 11 and 12, and integrally formed with the said base, is what I will term a housing for the dog of the device.

The housing comprises a substantially rectangular member including parallel sides 19 and an outer connecting member 20 for the sides. The connecting member 20 is substantially U-shaped and the bottom of the housing, for a portion of the length thereof is slotted so that the same is partly open. The sides, upon the inner ends thereof are projected upwardly, as indicated by the numerals 21, and between these sides is pivotally connected, as at 22 the dog 23. The dog is preferably in the nature of a block or casting formed at its upper and outer corner with an outstanding lug providing a lip 24, and being rounded downwardly and outwardly from said lip and received between the vertical members of the connecting element 20 of the sides of the housing. The contact of this end of the dog with the said connecting member 20 of the housing limits the swinging of the dog in one direction, the swinging of the dog in an opposite direction being limited by contact of the lower edge therewith with the bottom wall of the housing inward of the referred to opening in the said bottom thereof.

The depressed upper rounded surface of the dog is formed with a projection 25 which is adapted to be contacted by one of the jaws 14, when the trap is in its set condition, upon the compression of the spring 17. By reference to the drawings it will be noted that the pivot 20 passes through an elongated angular slot 26 in the dog, and the contact of the jaw 14 with the projection 25 on the dog will cause the latter to be moved upwardly and outwardly, bringing the lip 24 in direct engagement with a depression or socket 27 formed in the jaw 14, thus locking the trap in its set position.

Secured to the dog 24 in any desired or preferred manner is the pan 28 which extends transversely between the jaws 14 and 15.

One of the jaws, say the jaw 14, upon the inner surface thereof is provided with a knob or extension 29 that is designed to be received in a socket 30 in the jaw 15, when the jaws are brought together. The knob is round and is arranged near the outer end of the jaw 14, so that an animal can not work his paw outwardly from between the jaws when trapped by the jaws, he being prevented from working his paw inwardly from between the jaws in an inward direction by the eye at the end of the upper arm of the spring 17.

Having thus described the invention, what is claimed as new is:—

In an animal trap, a base, U-shaped jaws pivotally secured to the base, a knob on the inner face of one of the dogs adjacent to the outer end thereof, the second jaw having a socket to receive the knob, outwardly projecting upstanding inclined fingers on the jaws adjacent to the inner pivots thereof, a spring secured to the base and having an eye designed to contact with said fingers to swing the jaws to their open position when the spring is compressed, a pan, a dog secured to the pan, a housing therefor, a loose pivotal connection between the housing and the dog, means for limiting the swinging of the dog in two directions, said dog including an outwardly extending lip having a depressed curved portion projecting therefrom, an upstanding projection on the latter, one of said jaws having a socket therein, and said jaw designed to contact with the projection of the dog to swing the latter and bring the lip thereof into the socket to hold the spring contracted and the jaws in their open position.

In testimony whereof I affix my signature.

JACOB B. SITTS.